Jan. 27, 1970  B. W. PARTIN  3,491,726
SHOWER SAFETY BELT
Filed June 21, 1967
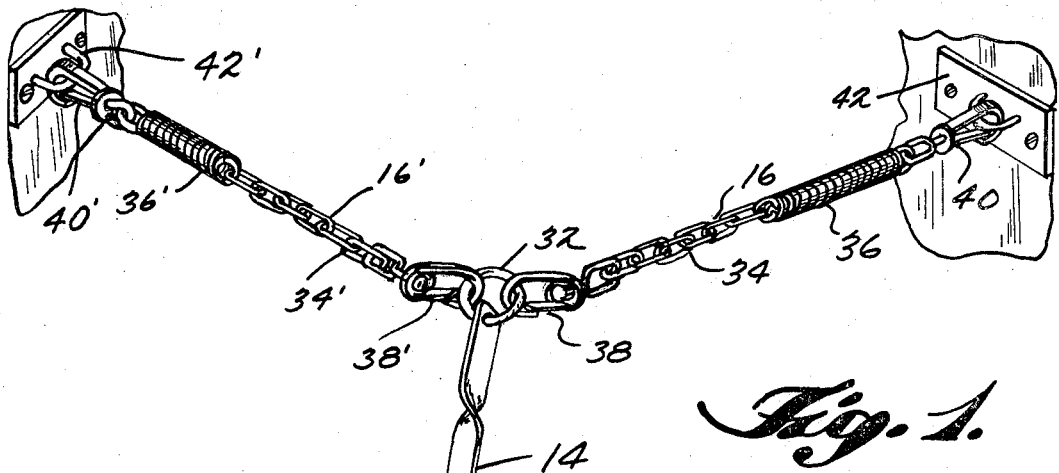
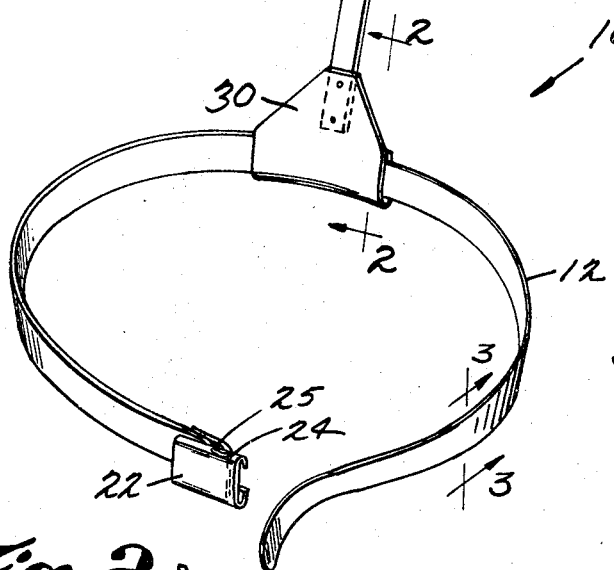
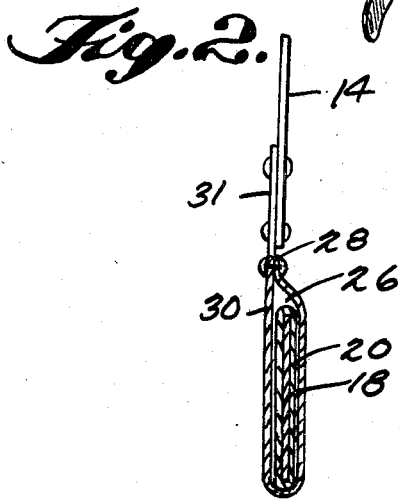
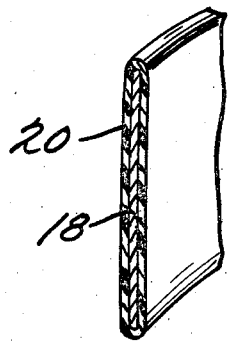
INVENTOR.
BOLLING W. PARTIN
BY
Cushman, Darby & Cushman
ATTORNEYS

United States Patent Office 3,491,726
Patented Jan. 27, 1970

3,491,726
SHOWER SAFETY BELT
Bolling W. Partin, P.O. Box 690,
Hopewell, Va. 23860
Filed June 21, 1967, Ser. No. 647,805
Int. Cl. A47k *3/00;* A01k *29/00*
U.S. Cl. 119—96                                              1 Claim

ABSTRACT OF THE DISCLOSURE

A shower safety belt provided with a strap and a pair of anchoring elements. The strap is secured to the belt at one end by means of a gusset plate and to the anchoring elements at the other end, by means of a ring. Each anchoring element comprises a coil spring and a length of chain, which are secured together and each element is provided with a swivel snap hook at each end for fastening the anchoring element to a wall bracket and the ring.

Brief description of the invention

The present invention relates to a safety belt and, in particular, to a safety belt adapted to be used in a shower stall.

The shower safety belt comprises an adjustable stainless steel belt that is covered with nylon, two extensible anchoring elements and a light stainless steel strap intermediate said belt and said anchoring elements. The light stainless steel strap is secured at one end to the belt by means of a gusset plate and is provided at the other end with an aperture which receives a ring. Each anchoring element comprises a coil spring and a length of chain which are secured together and are provided with a pair of swivel snap hooks which engage a wall bracket and the ring, respectively.

The present invention provides a strong durable shower safety belt which can be used by small children, invalids or anyone requiring a means of support.

It is an object of the invention to provide a safety belt which can be quickly attached to or detached from the supporting wall brackets.

It is a further object of the invention to provide a safety belt having extensible anchoring elements which permit additional movement by the user while maintaining tension on the safety belt to insure that the needed support is provided at all times.

A still further object of the invention is to provide a safety belt having extensible anchoring elements which retract the safety belt out of the way when it is not in use.

Other objects and advantages of the present invention will become more apparent from the following disclosure in combination with the accompanying drawing in which:

FIGURE 1 is a perspective view of the safety belt of the present invention;

FIGURE 2 is a sectional view of the gusset plate taken along line 2—2 of FIGURE 1; and FIGURE 3 is a sectional view taken along line 3—3 of FIGURE 1.

Detailed description of the inveniton

The shower safety belt generally indicated by reference character 10, comprises a belt 12, a strap 14 and anchoring elements 16, 16'. In the preferred form, the belt 12 is from 36 to 48 inches in length, strap 14 is approximately 24 inches in length and anchoring elements 16, 16' are of any suitable length required.

Belt 12 comprises a stainless steel strap 18, provided with a nylon cover 20 that completely surrounds the belt and adds both to the appearance of the belt and to the comfort of the user. The belt is also provided with adjustable buckle 22, which facilitates the quick and easy adjustment of the belt to the size required by the person utilizing the safety device.

As shown, the adjustable buckle 22 is provided with a wedging member 24 slidably mounted within tapered slots 25 of the buckle for retaining the belt in the desired position. However, it is contemplated that other means of retaining the belt could be utilized, if desired, such as a common belt buckle wherein a prong on the buckle passes through apertures in the strap.

As shown in FIGURE 2, belt 12 is frictionally retained at its midportion within a slot 26 of the stainless steel gusset plate 30. The slot 26 is formed by a folded-over section of the gusset plate which is secured at its edge 28 to the midportion of the gusset plate. The upper portion 31 of gusset plate 30 extends in a substantially vertical direction and is riveted, spot welded or secured by other suitable means to the lower portion of flexible strap 14 which extends upwardly and outwardly from the belt in the same general direction as the gusset plate. Strap 14 is twisted near its upper end so that the upper portion of the strap is oriented at right angles to the lower portion of the strap and an aperture 30 is provided on the upper portion of strap 14 for retaining ring 32.

Secured to ring 32 are the two identical anchoring elements 16, 16'. Each anchoring element comprises a length of chain 34, 34' and a spring 36, 36' which are secured at their inner ends to each other. The free ends of chains 34, 34' and springs 36, 36' are provided with swivel snap hooks 38, 38' and 40, 40' which are fastened to ring 32 and wall brackets 42, 42', respectively. While in the preferred form, a coil spring is utilized in the anchoring element, it is contemplated that other types of elastic members could also be utilized in the extensible anchoring element. Also various types of swivel snap hooks can be used as long as they can be readily attached or detached from ring 32 or brackets 42, 42'.

In use, the belt is merely placed about the trunk of the individual and adjusted until a snug, comfortable fit is obtained. The extensible anchoring elements 16, 16' along with the flexible strap 14, then permit the individual great freedom of movement while still maintaining tension on the safety belt to insure that the needed support is provided at all times. When he is through with the belt, the individual merely unbuckles the belt and the springs 36, 36' retract the belt up into its unused position. Of course, if desired, the whole belt assembly may be readily removed from the wall brackets 42, 42' by unfastening the snap hooks 40 and 40' or the belt including strap 14 and ring 32, may be readily detached from the anchoring elements 16, 16' by unfastening snap hooks 38, 38'.

While the preferred form of the invention has been shown and described, it is to be understood that all suitable modifications and equivalents may be resorted to.

What is claimed is:

1. A shower safety belt comprising:
    an adjustable belt, said belt being made of metal to provide adequate strength and being covered with a fabric for the comfort of the wearer;
    a gusset plate for carrying said adjustable belt, said gusset plate having a slot therein within which said belt is frictionally retained;
    a flexible metallic strap having upper and lower end portions, said lower end portions of said strap being secured to said gusset plate, said upper end portion being oriented at right angles to said lower end portion and pivotally secured to a ring for pivotal movement of said strap gusset plate and belt relative to said ring; and
    a pair of extensible anchoring elements connected to said ring for anchoring said ring to a pair of wall brackets, each of said extensible anchoring elements having swivel snap hooks at each end whereby said extensible anchoring elements can be readily attached to and detached from said ring and said wall brackets, and each of said anchoring elements comprising a coil spring and a length of chain to permit movement by the wearer while maintaining tension on the safety belt to insure that the needed support is provided at all times.

References Cited

UNITED STATES PATENTS

| | | | |
|---|---|---|---|
| 810,336 | 1/1906 | Higgins | 267—74 |
| 1,332,328 | 3/1920 | Fisher | 119—96 |
| 2,833,249 | 5/1958 | Cornman | 119—109 |
| 2,878,981 | 3/1959 | Guido | 119—96 |
| 2,911,947 | 11/1959 | Kramer | 119—109 |
| 3,088,438 | 5/1963 | Oliphant | 119—96 |
| 3,310,034 | 3/1967 | Dishart | 119—106 X |

ALDRICH F. MEDBERY, Primary Examiner

U.S. Cl. X.R.

119—106